(12) United States Patent
Yoshida et al.

(10) Patent No.: US 8,821,651 B2
(45) Date of Patent: *Sep. 2, 2014

(54) METHOD FOR SURFACE TREATING A HEAT EXCHANGER, HYDROPHILIZING TREATMENT AGENT, AND ALUMINUM HEAT EXCHANGER

(75) Inventors: Tatsuo Yoshida, Tokyo (JP); Masahiko Matsukawa, Tokyo (JP); Miwa Iida, Tokyo (JP); Shintaro Nakagawa, Tochigi (JP)

(73) Assignees: Nippon Paint Co., Ltd., Osaka (JP); Showa Denko K.K., Tokyo (JP)

( * ) Notice: Subject to any disclaimer, the term of this patent is extended or adjusted under 35 U.S.C. 154(b) by 665 days.

This patent is subject to a terminal disclaimer.

(21) Appl. No.: 13/011,180

(22) Filed: Jan. 21, 2011

(65) Prior Publication Data

US 2011/0180248 A1 Jul. 28, 2011

(30) Foreign Application Priority Data

Jan. 26, 2010 (JP) .................................. 2010-014778

(51) Int. Cl.
*C23C 22/56* (2006.01)
*F28F 19/02* (2006.01)
*F28F 19/00* (2006.01)

(52) U.S. Cl.
USPC ......... 148/247; 165/133; 165/134.1; 148/275

(58) Field of Classification Search
USPC ........................ 148/247, 275; 165/133, 134.1
See application file for complete search history.

(56) References Cited

U.S. PATENT DOCUMENTS

| 6,554,916 B2 | 4/2003 | Kojima et al. | |
| 2002/0040742 A1* | 4/2002 | Kojima et al. | 148/240 |
| 2003/0037914 A1* | 2/2003 | Inbe et al. | 165/133 |

FOREIGN PATENT DOCUMENTS

JP 2002-30462 1/2002

* cited by examiner

*Primary Examiner* — Lois Zheng
(74) *Attorney, Agent, or Firm* — Dilworth & Barrese, LLP.

(57) ABSTRACT

A method for surface treating a heat exchanger, a hydrophilizing treatment agent used in this method, and an aluminum heat exchanger obtained from this method are provided that excel in the initial adherence, hydrophilicity, and odor suppressibility, and can maintain these abilities for an extended time, while having little burden on the environment and the human body. The method for surface treating an aluminum heat exchanger that is brazed includes (1) a pickling treatment step; (2) a chemical conversion treatment step; and (3) a hydrophilization treatment step, in which the acidic cleaning agent contains nitric acid and sulfuric acid and contains ferric salt in a predetermined amount, the hydrophilizing treatment agent contains silica grains coated with a vinyl alcohol polymer and a polyallylamine resin.

3 Claims, No Drawings

METHOD FOR SURFACE TREATING A HEAT EXCHANGER, HYDROPHILIZING TREATMENT AGENT, AND ALUMINUM HEAT EXCHANGER

This application is based on and claims the benefit of priority from Japanese Patent Application No. 2010-014778, filed on 26 Jan. 2010, the content of which is incorporated herein by reference.

BACKGROUND OF THE INVENTION

1. Field of the Invention

The present invention relates to a method for surface treating a vacuum brazed heat exchanger, a hydrophilizing treatment agent, and an aluminum heat exchanger.

2. Related Art

Generally, heat exchangers are configured from aluminum or an aluminum alloy, and are made in a complex structure in which fins for exchanging heat are retained between tubes in narrow intervals. For this reason, the surfaces of the fins and the like have been hydrophilized to facilitate the shedding of moisture condensed during air-conditioning. However, the above-mentioned surfaces of fins and the like that have been hydrophilized repeatedly undergo heating and cooling and are exposed to severe conditions in which condensed moisture, dirt in the atmosphere, and microscopic organisms mix and adhere thereto; therefore, there has been a problem in that it is difficult for the hydrophilicity, odor suppressibility, and corrosion resistance to be preserved over an extended time.

The deposits of the brazing filler material can be exemplified as one of the causes of the degradation of heat exchangers. The fins and the like of heat exchangers are commonly assembled by brazing, using a brazing filler material (brazing material) such as aluminum-silicon alloy and aluminum-silicon-magnesium alloy. The method known for normal brazing include a method using a flux for removing the oxide film on the aluminum surface and preventing reoxidation, and a vacuum brazing method (VB method) in which brazing is performed while preventing reoxidation by eliminating the supply of oxygen with a high vacuum. In this way, there is no problem of flux residue since flux is not used in the case of the vacuum brazing method. However, anti-corrosion treatment such as chemical conversion treatment becomes difficult due to the deposits of the brazing filler material adhering to the surface of the fins and the like while brazing, and thus a suitable anti-corrosion coating film cannot be formed. As a result, there have been problems in that the corrosion resistance of the heat exchanger declines, and white rust (oxides of aluminum) forms. Furthermore, there is also a problem in that mold will grow in the moisture absorbed by the white rust, whereby an odor will emanate.

Japanese Unexamined Patent Application Publication No. 2002-30462 discloses a method of performing pickling using ferric salt to effectively remove the deposits of the brazing filler material, then performing a chemical conversion treatment, followed by performing a hydrophilizing treatment. However, the chemical conversion treatment agent used in such a method is primarily a chromate-based chemical conversion treatment agent. In a case of treating a brazed heat exchanger with a chromate-based chemical conversion treatment agent, a favorable chemical conversion coating film can be formed even if some deposits are remaining, and the adherence between the hydrophilic coating film formed thereafter and the chemical conversion coating film can be satisfactorily maintained. However, in recent years, there has been demand not to use chromate-based chemical conversion treatment agents from the viewpoint of the burden on the environment.

Treatment agents that make a heavy metal such a zirconium, titanium, and hafnium as the coating film forming component can be exemplified as non-chromium chemical conversion treatment agents. However, the chemical conversion coating films obtained from the aforementioned such non-chromium chemical conversion treatment agents are inferior in the uniformity of the coating film compared to a coating film obtained using a conventional chromate-based chemical conversion treatment agent, and thus may not be able to obtain a favorable chemical coating film. In particular, in a case of chemical conversion treating a brazed heat exchanger with a non-chromium chemical conversion treatment agent such as a zirconium-based chemical conversion treatment agent, there has been a problem in that an adequate chemical conversion coating film cannot be formed due to the influence of the deposits remaining on the heat exchanger, and thus the adherence with the hydrophilic coating film thus obtained with a conventionally used hydrophilizing treatment agent is lacking. As a result, a problem arises in that degradation of the hydrophilic coating film advances from repeated cooling and heating over an extended time period, and the chemical conversion coating film also degrades accompanying the degradation of the hydrophilic coating film, whereby it becomes difficult to maintain the hydrophilicity, odor suppressibility, and corrosion resistance.

In addition, concerning the odor suppressibility, although Japanese Unexamined Patent Application Publication No. 2002-30462 describes an odor suppressant composed of an organic substance having an amide group and/or phenol group, such an odor suppressant is used for suppressing the foul odor characteristic to the chromate contained in chromate-based chemical conversion treatment agents, and is not offered as any kind of solution to suppressing of the foul odor from the degradation of the hydrophilic coating film or chemical conversion coating film that is characteristic in a case of performing chemical conversion treatment using a non-chromium chemical conversion treatment agent.

SUMMARY OF THE INVENTION

The present invention takes the above-mentioned matters into account and has an object of providing a method for surface treating a heat exchanger that excels in initial adherence, hydrophilicity, and deodorizing properties, and can maintain these properties over an extended period, while having little burden on the environment and the human body, a hydrophilizing treatment agent used in this method, and an aluminum heat exchanger obtained according to this method.

According to the present invention, a method for surface treating a heat exchanger includes: (1) a pickling treatment step of causing an acidic cleaning agent to come into contact with a heat exchanger made of an aluminum material and vacuum brazed; (2) a chemical conversion treatment step of causing a zirconium-based chemical conversion treatment agent to come into contact with the aluminum material after the pickling treatment step; and (3) a hydrophilization treatment step of causing a hydrophilizing treatment agent to come into contact with the aluminum material after the chemical conversion treatment step, in which the acidic cleaning agent contains nitric acid and sulfuric acid, and contains 0.01 to 0.05% by mass of a ferric salt, and the hydrophilizing treatment agent contains silica grains coated by a vinyl alcohol polymer, and a polyallylamine resin, a total content of the silica grains and vinyl alcohol polymer being in the range of 0.2 to 25% by mass, and a mass ratio of silica grains to vinyl alcohol polymer being in the range of 30:70 to 70:30.

The above-mentioned ferric salt is preferably at least one selected from the group consisting of iron sulfate, iron nitrate, iron acetate, and iron chloride.

The above-mentioned heat exchanger is preferably an evaporator for a vehicle air-conditioner.

The present invention also includes a hydrophilizing treatment agent used in the above-mentioned method for surface treating a heat exchanger.

The present invention also includes an aluminum heat exchanger obtained according to the above-mentioned method for surface treating a heat exchanger.

The method for surface treating a heat exchanger according to the present invention can raise the adherence between the hydrophilic coating film and chemical conversion coating film by performing a pickling treatment step with an acidic cleaning agent containing nitric acid and sulfuric acid as well as a predetermined amount of ferric salt, and a hydrophilizing treatment step, after a chemical conversion treatment step with a zirconium-based chemical conversion treatment agent, of causing a hydrophilizing treatment agent coating silica grains coated by a vinyl alcohol polymer, and poylallylamine resin to come into contact with a heat exchanger made of an aluminum material, in which the total content of silica grains and vinyl alcohol polymer is 0.2 to 25% by mass, and the mass ratio of silica grains to vinyl alcohol polymer is a predetermined mass ratio. As a result, even if a zirconium-based chemical conversion treatment agent not using chromium, which is harmful to the environment and the human body, the method can obtain a hydrophilic coating film excelling in adherence with the chemical conversion coating film obtained from the above-mentioned zirconium-based chemical conversion treatment agent, and thus can impart corrosion resistance, hydrophilicity, and odor suppressibility to a heat exchanger made of an aluminum material.

DETAILED DESCRIPTION OF THE INVENTION

Hereinafter, the present invention will be explained in detail.

A method for surface treating a heat exchanger according to the present invention includes: (1) a pickling treatment step of causing an acidic cleaning agent containing nitric acid and sulfuric acid as well as a predetermined amount of a ferric salt to come into contact with a heat exchanged composed of an aluminum material; (2) a chemical conversion treatment step of causing a zirconium-based chemical conversion treatment agent to come into contact with the aluminum material after the pickling treatment step; and (3) a hydrophilizing treatment step of causing a hydrophilizing treatment agent to come into contact with the aluminum material after the chemical conversion treatment step. The method can form a hydrophilized coating film excelling in adherence with the chemical conversion coating film, even in a case of using a zirconium-based chemical conversion treatment, by using a hydrophilizing treatment agent containing silica grains coated by vinyl alcohol, and a polyallylamine resin, the total content of the silica grains and vinyl alcohol polymer being a predetermined content, and the mass ratio of silica grains to vinyl alcohol polymer being a predetermined mass ratio. Since pickling is performed jointly using nitric acid and sulfuric acid and further using an acidic cleaning agent containing a ferric salt in this case, deposits of the brazing filler material or the like can be effectively removed, and thus favorable chemical conversion treatment can be performed.

The above-mentioned pickling treatment step (1) is a step of removing impurities such as deposits of the brazing filler material, salts, etc. adhered to the heat exchanger using the acidic cleaning agent. The acidic cleaning agent used in the pickling treatment step (1) of the present invention contains nitric acid and sulfuric acid, as well as ferric salt. There is the advantage in performing treatment in this way in that the removal of deposits and the like originating from the brazing filler material is more effectively performed by jointly using nitric acid and sulfuric and further containing ferric salt. It should be noted that, herein, the acid concentration of nitric acid and sulfuric acid used jointly is preferably 1 to 10 N, and more preferably 3 to 6 N.

The above-mentioned ferric salt is not particularly limited, and can be exemplified by iron sulfate, iron nitrate, iron acetate, iron chloride, iron citrate, iron fluoride, iron bromide, iron phosphate, iron sulfamate, iron oxalate, iron lactate, and the like; however, at least one selected from the group consisting of iron sulfate, iron nitrate, iron acetate, and iron chloride is preferable due to being low cost. The ferric salt is preferably contained in the above-mentioned acidic cleaning agent within the range of 0.01% by mass to 5% by mass. Deposits originating from the brazing filler material can be more effectively removed by setting the content of ferric salt to within the above-mentioned range. The above-mentioned lower limit is more preferably 0.1% by mass, and the above-mentioned upper limit is more preferably 1% by mass.

The pH of the above-mentioned acidic cleaning agent is preferably no more than 4. A favorable cleaning effect can be obtained by setting the pH to no more than 4.

The above-mentioned pickling treatment step (1) can be performed by a conventionally known method such as a spray method or immersion method.

The above-mentioned pickling treatment step (1) is preferably performed at a liquid temperature of the acidic cleaning agent in the range of 10° C. to 85° C. In addition, the treatment time is preferably in the range of 30 seconds to 5 minutes. If the liquid temperature is less than 10° C. or the treatment time is less than 30 seconds, the removal of deposits may be insufficient, and if 85° C. is exceeded or 5 minutes is exceeded, the etching may be excessive.

The method for surface treating a heat exchanger according to the present invention further performs a chemical conversion treatment step (2) using a zirconium-based chemical conversion treatment agent. The zirconium-based chemical conversion treatment agent is a treatment agent containing zirconium as a film forming component. The source of the zirconium is not particularly limited, and can be exemplified by an alkali metal fluorozirconate such as $K_2ZrF_6$; a fluorozirconate such as $(NH_4)_2ZrF_6$; a soluble fluorozirconate such as a fluorozirconic acid such as $H_2ZrF_6$; zirconium fluoride; zirconium oxide; and the like.

The content of zirconium in the above-mentioned zirconium-based chemical conversion treatment agent is preferably in the range of 20 ppm to 10000 ppm as a metal ion concentration. If less than the above-mentioned lower limit, the performance of the chemical conversion film obtained may be insufficient, and if the above-mentioned upper limit is exceeded, the effect of being over this content may be undesirable and become economically disadvantageous. The above-mentioned lower limit is more preferably 50 ppm, and the above-mentioned upper limit is more preferably 2000 ppm. The zirconium-based chemical conversion treatment agent may include an acid such as phosphoric acid, manganic acid, permanganic acid, vanadic acid, tungstic acid, and molybdic acid.

The pH of the above-mentioned zirconium-based chemical conversion treatment agent is preferably within the range of 2.0 to 6.5. If the pH is less than 2.0, the etching may be excessive and sufficient coating film formation may not be possible. If the pH exceeds 6.5, the etching may be insufficient, and a favorable coating film may not be obtained. The above-mentioned lower limit is more preferably 3.0, and the above-mentioned upper limit is more preferably 5.5. An acidic compound such as nitric acid and sulfuric acid or a basic compound such as sodium hydroxide, potassium hydroxide and ammonia can be used in order to adjust the pH.

The chemical conversion treatment step (2) using the above-mentioned zirconium-based chemical conversion treatment agent is not particularly limited, and can be performed by causing a treatment agent and coating surface to come into contact under normal treatment conditions. The treatment temperature in the above-mentioned chemical conversion treatment step (2) is preferably within the range of 20° C. to 80° C. The above-mentioned lower limit is more preferably 30° C., and the above-mentioned upper limit is more preferably 70° C. The chemical conversion time in the above-mentioned chemical conversion treatment is preferably within the range of 5 seconds to 1200 seconds. The above-mentioned lower limit is more preferably 30 seconds, and the above-mentioned upper limit is more preferably 120 seconds. The chemical conversion treatment method is not particularly limited, and an immersion method, spray method and the like can be exemplified.

The method for surface treating a heat exchanger according to the present invention preferably includes a water rinsing treatment after the above-mentioned chemical conversion treatment step (2). This water rinsing treatment after chemical conversion is performed one or more times in order to make it so that the adhesion with the hydrophilic film thus obtained by the hydrophilizing treatment is not adversely affected thereafter. In this case, it is appropriate to perform the final water rinsing with purified water. Either spray rinsing or immersion rinsing may be applied in this water rinsing treatment after chemical conversion, or rinsing can be performing by combining these methods.

In the method for surface treating a heat exchanger according to the present invention, it is not absolutely necessary for there to be a drying step after the above-mentioned rinsing treatment after chemical conversion. Even if the hydrophilizing treatment step (3) were performed with the chemical conversion coating film in a wet state without performing a drying step, there would be no influence on the performance thus obtained. In addition, in a case of performing a drying step, it is preferable to perform cold-air drying, hot-air drying, or the like. In a case of performing hot-air drying, it is preferably at no more than 300° C. from the viewpoint of thermal energy savings.

The method for surface treating a heat exchanger of the present invention further performs the hydrophilizing treatment step (3) using a hydrophilizing treatment agent. The hydrophilizing treatment agent used in the present invention contains silica grains coated by a vinyl alcohol polymer, and a polyallylamine resin. The polyallylamine resin is not particularly limited so long as it has a constitutional unit represented by the follow formula (1).

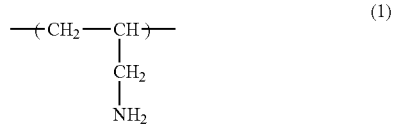

When the above-mentioned polyallylamine resin is blended, it is possible to raise the adherence between the hydrophilic coating film and the chemical conversion coating film obtained by the zirconium-based chemical conversion treatment agent by way of the action of the amine group. In other words, it is possible to maintain extended hydrophilicity without the hydrophilic coating film peeling off from the surface of the heat exchanger for an extended time by way of raising the adherence between the hydrophilic coating film and the chemical conversion coating film. In addition, since the occurrence of corrosion and foul odor following degradation of the hydrophilic coating film and chemical conversion coating film can be suppressed, the corrosion resistance and odor suppressibility can be suitably kept for an extended time. It should be noted that the polyallylamine resin can exhibit a superior effect on the adherence between the hydrophilic coating film and chemical conversion coating film, and can suitably maintain odor suppressibility, even compared to other resins and compounds having amine groups.

The method for preparing the above-mentioned polyallylamine resin is not particularly limited, and it can be prepared according to a well-known method. As the polyallylamine resin, a commercially available polyallylamine resin can be used such as "PAA-05" (polyallylamine, weight average molecular weight 5000, trade name, made by Nittobo Co., Ltd.), "PAA-15C" (polylallylamine, weight average molecular weight 15000, trade name, Nittobo Co., Ltd.), and "PAA-D11-HC1" (allylamine hydrochloride-diallylamine hydrochloride copolymer, weight average molecular weight 10000, trade name, Nittobo Co., Ltd.), without particular limitation. The polyallylamine resin can use, in a range that does not inhibit the object of the present invention, resin modified by a method such as acetylating a portion of the amino groups thereof, resin in which a portion or all of the amino groups have been neutralized with acid, and also resin cross-linked by a cross-linking agent in a range not affecting the solubility.

The above-mentioned polyallylamine resin preferably has a molecular weight in the range of 5000 to 70000. If less than 5000, a hydrophilic coating film having sufficient adherence may not be obtained, which is not preferable. If 70000 is exceeded, film formation may be hindered. The above-mentioned lower limit is more preferably 100000 and the above-mentioned upper limit is more preferably 25000.

The content of the above-mentioned polylallylamine resin in the hydrophilizing treatment agent is preferably within the range of 100 ppm to 5000 ppm by solid content. If less than 100 ppm, a hydrophilic film having sufficient adherence may not be obtained, which is not preferable. If 5000 ppm is exceeded, film formation may be hindered. The above-mentioned lower limit is more preferably 300 ppm, and the above-mentioned upper limit is more preferably 1000 ppm.

The hydrophilizing treatment agent used in the present invention further contains the silica grains coated by vinyl alcohol polymer. The silica grains have a function of raising the hydrophilicity of the coating film that is obtained from the uneven shape thereof. Furthermore, by the silica grains being coated by the vinyl alcohol polymer, a foul odor from exposure of the silica is suppressed and the hydrophilicity can be maintained over an extended period.

The above-mentioned silica grains are not particularly limited, and can be exemplified by fumed silica, colloidal silica, and the like. The above-mentioned fumed silica is prepared by high temperature hydrolysis of a halosilane such as trichlorosilane and tetrachlorosilane in the gas phase, and are fine grains having high surface area. The above-mentioned colloidal silica is made by dispersing acid- or alkali-stable silica sol in water. The average grain size of the silica grains is preferably within the range of 5 nm to 100 nm. The above-mentioned lower limit is more preferably 7 nm, and the above-mentioned upper limit is more preferably 60 nm. If the above-mentioned average grain size is less than 5 nm, the unevenness of the coating film formed with the hydrophilizing treatment may be lacking and the hydrophilicity may decline. If exceeding 100 nm, aggregates of a large grain size may generate in the hydrophilizing treatment agent, and the coating workability may decline. It should be noted that the average grain size referred to herein indicates the grain size at the point at which the accumulation curve is 50% when obtaining the accumulation curve with the total volume of the silica grains as 100%. The average grain size is measured by a dynamic light scattering method.

The silica grains used in the present invention are coated by a vinyl alcohol polymer. Although the vinyl alcohol polymer is not particularly limited, an at least 90% saponified vinyl alcohol polymer is preferred above all. If the degree of saponification is less than 90%, the hydrophilicity may be inferior. The degree of saponification is more preferably at least 95%. The vinyl alcohol polymer may be partially denatured such as carboxylic acid denatured, silicon denatured, amine denatured, and thiol denatured. It should be noted that the vinyl alcohol polymer preferably has a degree of polymerization in the range of 300 to 1500, and more preferably in the range of 500 to 1300.

The mass ratio of silica grains to vinyl alcohol polymer (silica grains:vinyl alcohol polymer coating silica grains) in the silica grains coated by the vinyl alcohol polymer is preferably within the range of 30:70 to 70:30. The silica grains can be effectively coated, and thus suitable hydrophilicity exhibited by setting to within the above-mentioned range. In addition, the average grain size of the silica grains coated by the above-mentioned vinyl alcohol polymer preferably is within the range of 5 nm to 1000 nm. The coated state of the silica fine grains coated by the vinyl alcohol polymer is made favorable and the emanation of a foul odor due to silica grains being exposed is effectively suppressed, by the mass ratio of silica grains to vinyl alcohol polymer and the average grain size of the silica fine grains coated by the vinyl alcohol polymer being within the above-mentioned ranges.

The method for preparing the silica grains coated by the above-mentioned vinyl alcohol polymer is not particularly limited, and can be exemplified by a method of dispersing silica grains in a vinyl alcohol polymer aqueous solution. Herein, in a case of mixing the vinyl alcohol polymer and the silica grains, both agglomerate due to interactions. The silica grains coated by the vinyl alcohol polymer can be prepared by causing the aggregate aggregated in this way to forcibly disperse by way of an ultrasonic disintegrator, micro medium disperser, or the like. It should be noted that the aggregate cannot be sufficiently dispersed with a mixer or the like merely having an agitation function, and it is necessary to use a disperser having a crushing function such as of a mill, or having an intense agitating effect in a minute fraction such as ultrasonic waves. As specific examples of such a disperser, for example, an ultrasonic homogenizer (US series) made by Nippon Seiki Seisakusho and a super mill (HM-15) made by Inoue Seisakusho can be exemplified. By forcibly dispersing in such a way, the agglomerated state with the vinyl alcohol polymer is released, and the silica grains become suitable grains in a coated state in which the surface of individual grains is coated by the vinyl alcohol polymer. As a result thereof, the silica grains come to stably exist as a dispersion in an aqueous medium.

The above-mentioned hydrophilizing treatment agent may include a hydrophilic resin other than the above-mentioned polyallylamine resin and vinyl alcohol-based polymer. A conventional well-known hydrophilic resin can be used as such a hydrophilic resin without particular limitation, and can be exemplified by a water soluble or water dispersible hydrophilic resin having a hydroxyl group, carboxyl group, amide group, amino group, sulfonate group, and/or ether group, for example. Above all, from the viewpoint of the coating film formed by the hydrophilization treatment showing favorable hydrophilicity, polyvinyl pyrrolidone, polyacrylic acid, polystyrene sulfonic acid, polyacrylamide, carboxymethyl cellulose, polyethylene oxide, water-soluble nylon, a copolymer of the monomers forming these polymers, and an acrylic polymer having polyoxyethylene chains such as 2-methoxy polyethylene glycol methacrylate/2-hydroxyethyl acrylate copolymer are preferable as the above-mentioned hydrophilic resin. The adherence between the hydrophilic coating film and chemical conversion coating film is further raised by containing these hydrophilic resins.

The solid content concentration in the above-mentioned hydrophilizing treatment agent is preferably within the range of 0.2% by mass to 25% by mass. If the solid content concentration is less than 0.2% by mass, adequate film formation of the hydrophilizing treatment agent and sufficient hydrophilicity of the film formed may not be obtained. If the solid content concentration exceeds 25% by mass, the hydrophilizing treatment agent will tend to agglomerate, and the workability and the coating film properties may be inferior. The above-mentioned lower limit is more preferably 1% by mass, and the above-mentioned upper limit is more preferably 20% by mass.

Although the solvent of the hydrophilizing treatment agent of the present invention is not particularly limited, it is preferably mainly water from the viewpoint of fluid waste disposal and the like. In addition, it may be jointly used with a solvent in order to improve film formation of the hydrophilizing treatment agent, and form a smooth film more uniformly. The solvent is not particularly limited so long as being generally used in paints and being able to mix uniformly with water, and can be exemplified by an organic solvent of an alcohol system, a ketone system, ester system, ether system, or the like. The amount of the above-mentioned solvent used is preferably within the range of 0.01% by mass to 5% by mass relative to the hydrophilizing treatment agent of the present invention.

The hydrophilizing treatment agent of the present invention may further contain other additives. The above other additives are not particularly limited, and can be exemplified by a hardener, dispersant, anti-corrosion additive, antibacterial agent, pigment, surfactant, lubricant, deodorizer, or the like.

The above-mentioned hardener is not particularly limited, and can be exemplified by an epoxy compound, dialdehyde compound, phenolic compound, urethane compound, and the like.

The dispersant is not particularly limited and can be exemplified by a surfactant, dispersed resin, and the like.

The above-mentioned anti-corrosion additive is not particularly limited, and can be exemplified by tannic acid, an imidazole compound, triazine compound, triazole compound, guanine compound, hydrazine compound, zirconium compound, and the like. Above all, a zirconium compound is preferable due to being able to effectively impart the anti-corrosion property. The zirconium compound is not particularly limited, and can be exemplified by an alkali metal fluorozirconate such as $K_2ZrF_6$; a fluorozirconate such as $(NH_4)_2ZrF_6$; a soluble fluorozirconate such as a fluorozirconic acid such as $H_2ZrF_6$; zirconium fluoride; zirconium oxide; and the like.

The above-mentioned antibacterial agent is not particularly limited, and can be exemplified by zinc pyrithione, 2-(4-thiazoryl)-benzimidazole, 1,2-benzisothiazoline, 2-n-octyl-4-isothiazoline-3-on, N-(fluorodichloromethylthio)

phthalimide, N,N-dimethyl-N'-phenol-N'-fluorodichloromethylthio)-sulfamide, methyl 2-benzimidazolecarbamate, bis(dimethylthiocarbamoyl)-disulfide, N-(trichloromethylthio)-4-cyclohexane-1,2-dicarboxyimide, barium metaborate, and the like. The above-mentioned antibacterial agent can exhibit an effect by being added to the hydrophilizing treatment agent so as to make a concentration of at least 10 ppm.

The above-mentioned pigment can be exemplified by various color pigments such as inorganic pigments and organic pigments such as titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, ferric oxide ($Fe_2O_3$, $Fe_3O_4$) and aluminum oxide ($Al_2O_3$).

The above-mentioned odor suppressant is not particularly limited, and can be exemplified by an organic substance having an amide group and/or phenol group. These odor suppressants can suppress the foul odor of a chromate characteristic when using a chromate-based chemical conversion treatment agent in particular. As a result, there is no necessity to have these odor suppressants contained in so far as performing chemical conversion treatment using a non-chromium chemical treatment agent.

In regards to the film thickness of the hydrophilic coating film obtained in the above-mentioned step (3), the amount of coating film is preferably within the range of 0.1 $g/m^2$ to 3 $g/m^2$. The above-mentioned upper limit is more preferably 2 $g/m^2$. The case of the film thickness of the coating film being less than 0.1 $g/m^2$ is not preferable because the hydrophilic durability of the fin material may be insufficient.

A heat exchanger treated by the method for surface treating a heat exchanger of the present invention is composed of an aluminum material. The aluminum material is aluminum or an alloy thereof. The aluminum material is not particularly limited, and can be exemplified by 3000 series aluminum alloy, 4000 series aluminum alloy, and the like.

The method for surface treating a heat exchanger of the present invention can effectively remove deposits of the brazing filler material and the like, as a pickling treatment step (1), with an acidic cleaning liquid jointly using nitric acid and sulfuric acid and further containing ferric salt, and can adequately carry out chemical conversion treatment in a chemical conversion treatment step (2), and thus can be suitably used on a heat exchanger having a brazed part. This brazing is performed by a vacuum brazing method that does not employ flux. In addition, as such a heat exchanger having a brazed part, for example, an evaporator for a vehicle air-conditioner on which assembling of fins and tubes is performed by brazing can be exemplified. The aluminum heat exchanger obtained according to the method for surface treating a heat exchanger of the present invention is also included also in the present invention.

EXAMPLES

Next, the present invention will be further explained more specifically giving Examples and Comparative Examples. The present invention is not to be limited to only these examples. In addition, in the examples, "%" indicates "% by mass" and "parts" indicates "parts by mass" unless otherwise noted.

Example 1

Preparation of Hydrophilizing Treatment Agent

Aggregates were formed by adding 25 parts by mass of fumed silica (average grain size 40 nm) into an aqueous solution in which 25 parts by mass of vinyl alcohol-based polymer (degree of saponification of at least 98%) fine powder had been dissolved in 950 parts by mass of purified water, and agitating. Next, a dispersed solution of vinyl alcohol polymer coated silica grains with an average grain size of 500 nm was obtained by forcibly causing these aggregates to disperse using an ultrasonic disintegrator (ultrasonic homogenizer made by Nippon Seiki Seisakusho). A hydrophilizing treatment agent was obtained by further adding zinc pyrithione as an antibacterial agent into this aqueous medium so as to make a concentration of 10 ppm, and further adding 500 ppm of "PAA-15C" (polylallylamine, weight average molecular weight 15000, trade name, Nittobo Co., Ltd.) as a polyallylamine resin. It should be noted that a portion of the hydrophilizing treatment agent thus obtained was diluted with deionized water and the average grain size was measured with a dynamic light scattering instrument ("ELS-800", trade name, Otsuka Electronics Co., Ltd.).

Using an acidic cleaning agent containing 10% by mass nitric acid (2.3 N), 5% by mass sulfuric acid, and 1% by mass ferric salt, "1000 series aluminum" (trade name, made by Nippon Testpanel Co., Ltd., 70 mm×150 mm×0.8 mm) and an evaporator for a vehicle air-conditioner made by Showa Denko Co., Ltd. and manufactured by a vacuum brazing method were immersed for 4 minutes in a bath in which this acidic cleaning agent was warmed to 65° C., extracted therefrom, and then thoroughly washed with tap water. Furthermore, this test piece and the evaporator for a vehicle air-conditioner were similarly immersed for 90 seconds in a bath in which a zirconium-based chemical conversion treatment agent ("Alsurf 90", trade name, Nippon Paint Co., Ltd.) was warmed to 50° C., and subsequently thoroughly washed with tap water.

Next, this test piece and evaporator for a vehicle air-conditioner were immersed for 1 minute in a 20° C. bath of the above-mentioned hydrophilizing treatment agent, extracted, and then dried by heating for 45 minutes at a reached temperature of 170° C., thereby completing a hydrophilization treated test piece and evaporator for a vehicle air-conditioner with a coating film in the amount of 1 $g/m^2$.

Example 2

A hydrophilization treated test piece and hydrophilization treated evaporator for a vehicle air-conditioner were completed similarly to Example 1 except for changing the blended amount of polyallylamine to 1000 ppm.

Example 3

A hydrophilization treated test piece and hydrophilization treated evaporator for a vehicle air-conditioner were completed similarly to Example 1 except for changing the blended amount of polyallylamine to 5000 ppm.

Comparative Example 1

A hydrophilization treated test piece and hydrophilization treated evaporator for a vehicle air-conditioner were completed similarly to Example 1 except for not having performed hydrophilization treatment using the hydrophilizing treatment agent.

Comparative Example 2

A hydrophilization treated test piece and hydrophilization treated evaporator for a vehicle air-conditioner were completed similarly to Example 1 except for not having blended polyallylamine.

Comparative Example 3

A hydrophilization treated test piece and hydrophilization treated evaporator for a vehicle air-conditioner were completed similarly to Example 1 except for blending 1000 ppm of "PVAM0595B" (polyvinylamine, weight average molecular weight 60000, trade name, made by Mitsubishi Chemical Corporation) as a resin having amino groups in place of polyallylamine.

Comparative Example 4

A hydrophilization treated test piece and hydrophilization treated evaporator for a vehicle air-conditioner were completed similarly to Example 1 except for blending 1000 ppm of glycine in place of polyallylamine.

Comparative Example 5

A hydrophilization treated test piece and hydrophilization treated evaporator for a vehicle air-conditioner were completed similarly to Example 1 except for blending 1000 ppm of phenol, which is an odor suppressant used in a case of using a chromate-based chemical conversion treatment agent, in place of polyallylamine.

Comparative Example 6

A hydrophilization treated test piece and hydrophilization treated evaporator for a vehicle air-conditioner were completed similarly to Example 1 except for blending 1000 ppm of hydrazide adipate, which is an odor suppressant used in a case of using a chromate-based chemical conversion treatment agent, in place of polyallylamine.

Adherence

Cellophane tape (made by Nichiban) was affixed and peeled off each of the hydrophilized test pieces thus obtained and hydrophilized test pieces caused to degrade by immersing for one week in room-temperature purified water. The surface area of the remaining coating film was measured, and evaluated with the following criterion. The results are shown in Table 1.
A: 0% peeled off
B: 50% peeled off or less
C: 50-100% peeled off Hydrophilicity Adhesive tape was affixed and peeled off each of the initial articles of the hydrophilized test pieces thus obtained and the hydrophilized test pieces caused to degrade by immersing for one week in room-temperature purified water. 2 µL microliters of purified water were placed on the tape detached portions, and the contact angle was measured. The measurements of contact angle were carried out using a CA-Z automatic contact angle meter (made by Kyowa Interface Science Co., Ltd.).

Odor Suppressibility

The odor for each of the initial articles of the evaporator for a vehicle air-condition and an evaporator for a vehicle air-conditioner caused to degrade by immersing in water for 168 hours was evaluated in five stages. It should be noted that two points or less in the odor evaluation are passing.
0 . . . points no odor
1 . . . point faint odor
2 . . . points easily detectable odor
3 . . . points obvious odor
4 . . . points strong odor
5 . . . points very strong odor
The above results are shown in Table 2.

TABLE 1

| | PICKLING TREATMENT | CHEMICAL CONVERSION TREATMENT | ADDITIVE OF DEODORIZING TREATMENT AGENT | | |
|---|---|---|---|---|---|
| | | | COMPOUND NAME | Mw | AMOUNT ADDED (ppm) |
| EXAMPLE 1 | WITH | WITH | POLYALLYLAMINE | 15.000 | 500 |
| EXAMPLE 2 | WITH | WITH | POLYALLYLAMINE | 15.000 | 1.000 |
| EXAMPLE 3 | WITH | WITH | POLYALLYLAMINE | 15.00 | 5.000 |
| COMPARATIVE EXAMPLE 1 | WITH | WITH | NO HYDROPHILIZING TREATMENT | | |
| COMPARATIVE EXAMPLE 2 | WITH | WITH | WITHOUT | — | — |
| COMPARATIVE EXAMPLE 3 | WITH | WITH | POLYVINYLAMINE | 60.000 | 1.000 |
| COMPARATIVE EXAMPLE 4 | WITH | WITH | GLYCINE | 75 | 1.000 |
| COMPARATIVE EXAMPLE 5 | WITH | WITH | PHENOL | 94 | 1.000 |
| COMPARATIVE EXAMPLE 6 | WITH | WITH | HYDRAZIDE ADIPATE | 174 | 1.000 |

TABLE 2

| | ADHERENCE | | HYDROPHILICITY | | ODOR SURPRESSIBILITY | |
|---|---|---|---|---|---|---|
| | INITIAL ARTICLE | DEGRADED ARTICLE | INITIAL ARTICLE | DEGRADED ARTICLE | INITIAL ARTICLE | DEGRADED ARTICLE |
| EXAMPLE 1 | A | A | 18 | 24 | 1.5 | 1.7 |
| EXAMPLE 2 | A | A | 20 | 23 | 1.5 | 1.8 |
| EXAMPLE 3 | A | A | 19 | 25 | 2.0 | 2.0 |
| COMPARATIVE EXAMPLE 1 | — | — | 55 | 53 | 3.5 | 3.5 |

TABLE 2-continued

|  | ADHERENCE | | HYDROPHILICITY | | ODOR SURPRESSIBILITY | |
| --- | --- | --- | --- | --- | --- | --- |
|  | INITIAL ARTICLE | DEGRADED ARTICLE | INITIAL ARTICLE | DEGRADED ARTICLE | INITIAL ARTICLE | DEGRADED ARTICLE |
| COMPARATIVE EXAMPLE 2 | B | C | 19 | 53 | 1.5 | 2.2 |
| COMPARATIVE EXAMPLE 3 | C | C | 20 | 53 | 3.5 | 3.3 |
| COMPARATIVE EXAMPLE 4 | C | C | 18 | 53 | 1.9 | 2.2 |
| COMPARATIVE EXAMPLE 5 | C | C | 20 | 53 | 1.8 | 2.2 |
| COMPARATIVE EXAMPLE 6 | C | C | 20 | 53 | 1.6 | 2.2 |

It can be seen from Table 1 that, for the hydrophilized evaporators for a vehicle air-conditioner and the hydrophilized test pieces obtained from Examples 1 to 3 blending the silica grains coated by the vinyl alcohol polymer in the hydrophilizing treatment agent, and polyallylamine resin, the adherence between the zirconium-based chemical conversion treated coating film and the hydrophilic coating film were favorable, and the hydrophilicity was also favorable. On the other hand, it can be seen that the adherence between the zirconium-based chemical conversion coating film and the hydrophilic coating film were inferior in Comparative Examples 1 to 6, and the hydrophilicity and odor suppressibility declined particularly for the degraded articles.

INDUSTRIAL APPLICABILITY

The method for hydrophilizing treatment of a heat exchanger of the present invention raises the adherence between the hydrophilic coating film and the chemical conversion coating film by employing a hydrophilizing treatment agent containing silica grains coated by a vinyl alcohol polymer, and polyallylamine resin. This enables hydrophilicity, odor suppressibility, and anti-corrosion properties to be imparted over an extended period, while using a zirconium-based chemical conversion treatment agent that has little burden on the environment and the human body.

What is claimed is:

1. A method for surface treating a heat exchanger, comprising:
   (1) a pickling treatment step of causing an acidic cleaning agent to come into contact with a heat exchanger made of an aluminum material and vacuum brazed;
   (2) A chemical conversion treatment step of causing a zirconium-based chemical conversion treatment agent to come into contact with the aluminum material after the pickling treatment step; and
   (3) a hydrophilization treatment step of causing a hydrophilizing treatment agent to come into contact with the aluminum material after the chemical conversion treatment step,
   wherein the acidic cleaning agent contains nitric acid and sulfuric acid, and contains 0.01 to 5% by mass of a ferric salt, and
   wherein the hydrophilizing treatment agent contains silica grains coated by a vinyl alcohol polymer, and a polyallylamine resin, a total content of the silica grains and vinyl alcohol polymer being in the range of 0.2 to 25% by mass, a mass ratio of silica grains to vinyl alcohol polymer being in the range of 30:70 to 70:30, and a content of the polyallylamine resin being the range of 100 ppm to 5000 ppm.

2. The method according to claim 1, wherein the ferric salt is at least one selected from the group consisting of iron sulfate, iron nitrate, iron acetate, and iron chloride.

3. The method according to claim 1, wherein the heat exchanger is an evaporator for a vehicle air-conditioner.

* * * * *